United States Patent
Hung et al.

(10) Patent No.: US 10,197,443 B2
(45) Date of Patent: Feb. 5, 2019

(54) SPECTRUM MEASUREMENT SYSTEM, SPECTRUM MEASUREMENT DEVICE, OPTICAL MEASUREMENT METHOD AND OPTICAL CALIBRATION METHOD

(71) Applicant: OTO PHOTONICS INC., Hsinchu (TW)

(72) Inventors: Chien-Hsiang Hung, Taipei (TW); Sheng-Wang Lin, Hsinchu (TW); Hsu-Feng Cheng, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 56 days.

(21) Appl. No.: 15/614,627

(22) Filed: Jun. 6, 2017

(65) Prior Publication Data
US 2018/0202863 A1 Jul. 19, 2018

(30) Foreign Application Priority Data
Jan. 16, 2017 (TW) .............................. 106101443 A (51) Int. Cl.
*G01J 3/00* (2006.01)
*G01J 3/28* (2006.01)

(52) U.S. Cl.
CPC ......... *G01J 3/28* (2013.01); *G01J 2003/2866* (2013.01)

(58) Field of Classification Search
CPC ... G01J 3/28; G01J 2003/2866; G01N 21/274
USPC ....................................................... 356/300
See application file for complete search history.

(56) References Cited

U.S. PATENT DOCUMENTS

2008/0259318 A1* 10/2008 Pan ........................... G01J 3/02
356/73

OTHER PUBLICATIONS

Simple spectral stray light correction method for array spectroradiometers published in Applied Optics, vol. 45, No. 6 on Feb. 20, 2006 (Year: 2006)*

* cited by examiner

*Primary Examiner* — Tarifur R Chowdhury
*Assistant Examiner* — Jonathon Cook
(74) *Attorney, Agent, or Firm* — Cheng-Ju Chiang (57) ABSTRACT

An optical calibration method for a spectrum measurement device including a light-input part includes: measuring a plurality of narrow-band rays by the light-input part to obtain a plurality of narrow-band spectrum impulse responses, respectively; establishing a stray light database according to the narrow-band spectrum impulse responses; generating a correction program according to the stray light database; measuring a spectral radiant standard light by the light-input part to obtain measurement spectrum data; and generating a calibration coefficient program based on the measurement spectrum data and spectral radiant standard spectrum data, wherein the calibration coefficient program matches the measurement spectrum data with the spectral radiant standard spectrum data, and the spectral radiant standard spectrum data is obtained by measuring the spectral radiant standard light by a standard spectrum measurement device. A spectrum measurement device, an optical measurement method and an optical calibration method are also provided.

20 Claims, 8 Drawing Sheets

SPECTRUM MEASUREMENT SYSTEM, SPECTRUM MEASUREMENT DEVICE, OPTICAL MEASUREMENT METHOD AND OPTICAL CALIBRATION METHOD

TECHNICAL FIELD

The present invention relates to an optical measurement system, an optical measurement device and an optical calibration method, and more particularly to a spectrum measurement system, a spectrum measurement method and an optical calibration method applied to the spectrum measurement system and the spectrum measurement method.

BACKGROUND

Spectrometer is a common optical measurement device capable of analyzing light to obtain spectrum. Today, many industries, such as biotechnology, display panel and light emitting diodes (LED) use more than one spectrometer in the production line. Before measuring the product or sample for the first time, these spectrometers perform spectral radiant flux calibration by using a spectral radiant flux standard lamp, such as a halogen lamp.

However, when each spectrometer receives the light from the spectral radiant flux standard lamp for calibration, stray light may be generated inside these spectrometers, and the stray light may have a negative impact on the measurement results and therefore reduce the accuracy of spectral radiant flux. In addition, the stray light of these spectrometers is different from each other, so these measurement results obtained by using these spectrometers to measure the same product or sample may have a difference which is obvious or cannot be ignored. As a result, the measurement results obtained by these spectrometers are inconsistent.

SUMMARY

The present invention provides an optical calibration method that improves accuracy by reducing the impact of stray light on measurement results.

The present invention provides a spectrum measurement device using the above-described optical calibration method.

The present invention provides a spectrum measurement system including a plurality of the above-mentioned spectrum measurement devices and using the above-mentioned optical calibration method to assist these spectrum measurement devices to have a consistent measurement result.

The present invention provides a spectrum measurement method applicable to the above-mentioned spectrum measurement device and spectrum measurement system.

One of the embodiments of the present invention provides an optical calibration method for a spectrum measurement device. The spectrum measurement device includes a light-input part. The optical calibration method includes steps of: measuring, by the spectrum measurement device, a plurality of narrow-band rays by the light-input part to obtain a plurality of narrow-band spectrum impulse responses, respectively; establishing a stray light database according to the narrow-band spectrum impulse responses, wherein the stray light database has stray light information of the spectrum measurement device and its light-input part; generating a correction program belonging to the spectrum measurement device according to the stray light database, wherein the correction program is used to correct a stray light generated by the spectrum measurement device and its light-input part; in a state in which the correction program is enabled, measuring, by the spectrum measurement device, a spectral radiant standard light by the light-input part to obtain measurement spectrum data processed by the correction program; and generating a calibration coefficient program belonging to the spectrum measurement device based on the measurement spectrum data and spectral radiant standard spectrum data, wherein the calibration coefficient program matches the measurement spectrum data with the spectral radiant standard spectrum data, and the spectral radiant standard spectrum data is obtained by measuring, by a standard spectrum measurement device, the spectral radiant standard light.

One of the embodiments of the present invention provides a spectrum measurement system, which includes a first spectrum measurement device and an external processing device. The first spectrum measurement device is configured to generate a first correction program and a first calibration coefficient program belonging to the first spectrum measurement device by using the above-described optical calibration method. The first spectrum measurement device includes a first optical module and a first circuit module. The first optical module includes a first light-input part and a first spectrum former. The first light-input part is configured to receive a first survey light. The first spectrum former is configured to generate a plurality of first spectrum beams from the first survey light. The first circuit module includes a first light receiver and a first control unit. The first light receiver is configured to generate first spectrum data according to the first spectrum beams. The first control unit is electrically connected to the first light receiver. The external processing device is coupled to the first control unit. The first control unit or the external processing device processes the first spectrum data according to the first correction program and/or the first calibration coefficient program.

One of the embodiments of the present invention provides a spectrum measurement device for generating a correction program and a calibration coefficient program belonging to the spectrum measurement device by using the above-described optical calibration method. The spectrum measurement device includes an optical module and a circuit module. The optical module is configured to receive a survey light and generate a plurality of spectrum beams from the survey light. The circuit module includes a light receiver and a control unit. The light receiver is configured to receive the spectrum beams to generate spectrum data. The control unit is electrically connected to the light receiver. The control unit or an external processing device processes the spectrum data according to the correction program and/or the calibration coefficient program.

One of the embodiments of the present invention provides an optical measurement method applicable to a spectrum measurement device processed by the above-described optical calibration method. The optical measurement method includes steps of: establishing a spectrum measurement system, wherein the spectrum measurement system comprises a first spectrum measurement device configured to generate a first correction program and a first calibration coefficient program belonging to the first spectrum measurement device by using the above-described optical calibration method; measuring, by the first spectrum measurement device, a first survey light to obtain first spectrum data; and in a state in which the first correction program and/or the first calibration coefficient program is enabled, processing the first spectrum data according to the first correction program and/or the first calibration coefficient program.

By using the above correction program, the impact of stray light on the measurement result is reduced it eliminated, so that the accuracy of the luminous flux of the spectrum measurement device is improved and these spectrum measurement devices can have a consistent measurement result.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
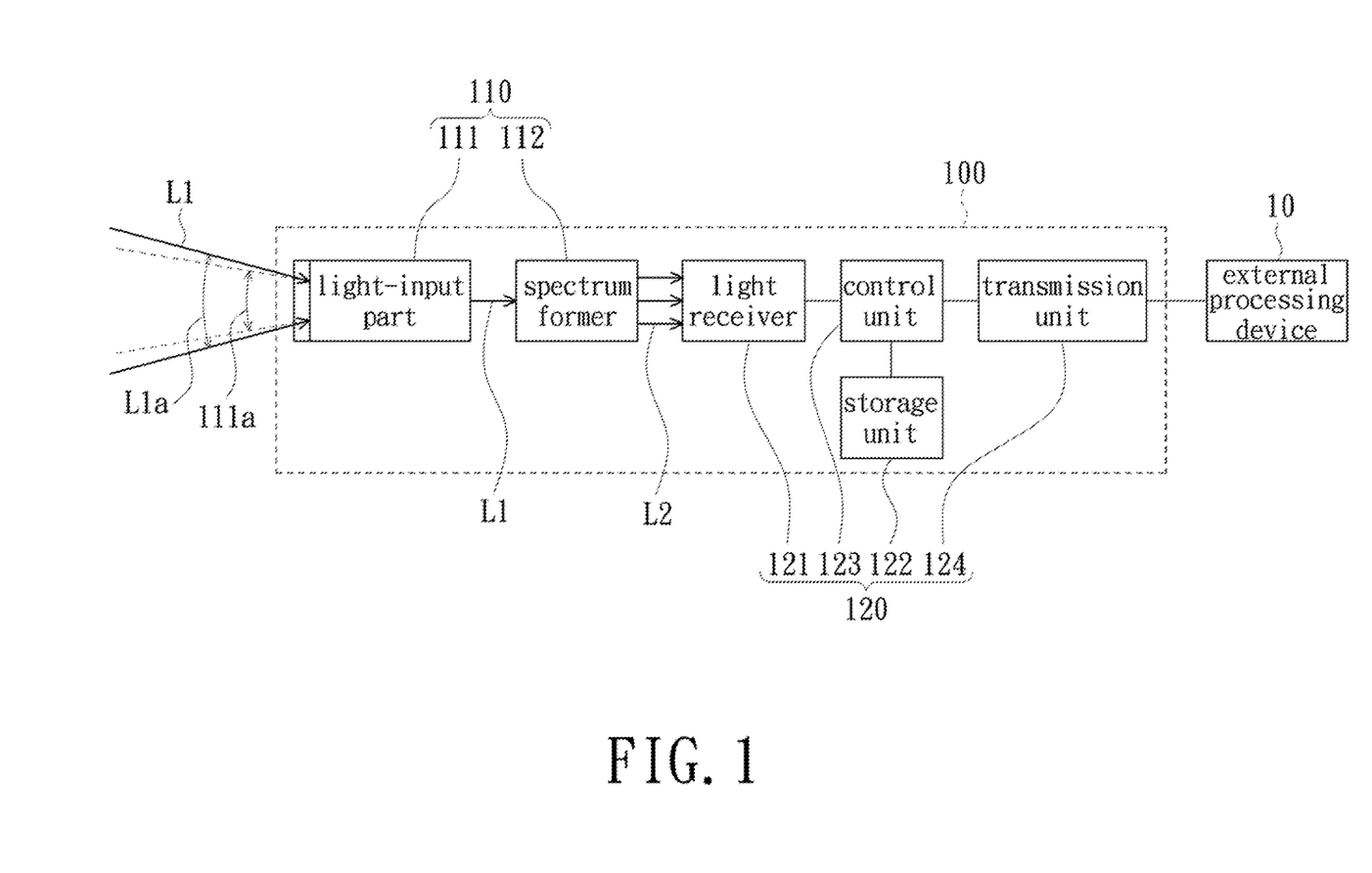
FIG. 1 is a block diagram of a spectrum measurement device in accordance with an embodiment of the present invention.

Referring to FIG. 1, which is a block diagram of a spectrum measurement device 100 in accordance with an embodiment of the present invention. In the embodiment shown in FIG. 1, the spectrum measurement device 100 is configured to measure optical spectrums and includes an optical module 110 and a circuit module 120. The spectrum measurement device 100 may be a spectrometer, a spectrophotometer, an illuminometer, an integrating sphere measuring system or a colorimeter. The optical module 110 is configured to receive a survey light L1 and generate a plurality of spectrum beams L2 from the survey light L1. The circuit module 120 is configured to receive these spectrum beams L2 and convert these spectrum beams L2 into electrical signals containing spectrum information.

The optical module 110 includes a light-input part 111 and a spectrum former 112, wherein both of the light-input part 111 and the spectrum former 112 are disposed on a path of the survey light L1. The light-input part 111 is configured to receive the survey light L1. In addition, the light-input part 111 may include a detachable optical part and/or a non-detachable optical part. The detachable optical part includes an integrating sphere, a cosine corrector, an optical coupler, an optical fiber, a filter and/or a lens group; and the non-detachable optical part includes a lens group, an optical fiber, a filter and/or a slit. In FIG. 1, the light-input part 111 is exemplified by including an optical fiber 111f as in the following description.

The survey light L1 may be a parallel light, a focused light beam or a diverging light beam. In the embodiment shown in FIG. 1, the survey light L1 is a focused light beam. For example, the survey light L1 may be focused by at least one lens. Therefore, the survey light L1 may have a converging angle L1a. As shown in FIG. 1, the light-input part 111 has a light-receiving angle 111a smaller than the converging angle L1a. However, in other embodiments, the light-receiving angle 111a may be equal to the converging angle L1a. Since the light-receiving angle 111a is smaller than or equal to the converging angle L1a, the numerical aperture (NA) of the survey light L1 is greater than or equal to the numerical aperture of the light-input part 111, so that a light-receiving area (not shown) and the light-receiving angle of the light-input part 111 can be completely irradiated by the survey light L1. In addition, in the embodiment shown in FIG. 1, the survey light L1 is a focused light beam. However, in other embodiments, the survey light L1 may be a parallel light or a plurality of rays directly emitted from a point light source, and is not limited to the light beam shown in FIG. 1.

The survey light L1 passing through the light-input part 111 is emitted into the spectrum former 112, and the spectrum former 112 generates a plurality of spectrum beams L2 from the survey light L1. The spectrum former 112 may include a collimator, a focusing mirror, a spectroscope, a filter, a grating and/or a diffuser to generate these spectrum beams L2. The circuit module 120 includes a light receiver 121, a storage unit 122 and a control unit 123. In the hardware aspect, the circuit module 120 may be a printed circuit board assembly (PCBA), and the light receiver 121, the storage unit 122 and the control unit 123 are all mounted on at least one circuit board. The control unit 123 is electrically connected to the light receiver 121 and the storage unit 122 to control the light receiver 121 and the storage unit 122. The control unit 123 is, for example, a programmable logic controller (PLC), a microcontroller (MCU), a microprocessor (μP) or a programmable logic device (PLD).

The light receiver 121 is configured to receive these spectrum beams L2 generated by the spectrum former 112 and convert these spectrum beams L2 into an electrical signal containing spectrum information. The light receiver 121 may be a one-dimensional or two-dimensional optical sensor array, such as a photodiode array, a charge-coupled device (CCD) or a complementary metal-oxide semiconductor (CMOS). The light receiver 121 transmits the above-described electrical signal to the control unit 123, so that the control unit 123 process the spectrum information contained in the electric signal to generate spectrum data, which is referred to as the measurement result of the survey light L1.

The storage unit 122 may be a non-volatile memory, such as a flash memory. Therefore, the storage unit 122 may be a memory card, such as a secure digital memory card (SD card) or a memory stick (MS). The storage unit 122 is configured to store a plurality of programs. The control unit 123 is configured to execute the program in the storage unit 122 to control the operation of the light receiver 121, wherein the control unit 123 can selectively enable at least two of these programs. After processing the spectrum information contained in the electrical signal, the control unit 123 may store the spectrum data into the storage unit 122.

Therefore, the storage unit 122 not only stores programs but also stores the measurement results (i.e., spectrum data) of the survey light L1.

The circuit module 120 may further include a transmission unit 124 electrically connected to the control unit 123. The transmission unit 124 may be a port, which may be a serial port or a parallel port, such as a universal serial bus (USB), an RS-232-C serial port or an RS-485 serial port. The transmission unit 124 may be electrically connected to an external processing device 10, such as a notebook computer, a desktop computer, a tablet computer or an industrial computer, by using an electrical cable (not shown). That is, the control unit 123 can be coupled to the external processing device 10 via the transmission unit 124 and the electrical cable; therefore, the above-described spectrum data (i.e., the measurement result of the survey light L1) can be transmitted to the external processing device 10 via the transmission unit 124 and the electrical cable, so that the external processing device 10 can perform subsequent processing on the spectrum data.

In addition, the transmission unit 124 may be a wireless transmission unit, so that the control unit 123 can be coupled to the external processing device 10 via a Wi-Fi or a Bluetooth link, and thereby transmits the above-described spectrum data to the external processing device 10 via Wi-Fi or Bluetooth link; wherein the external processing device 10 may be a cloud server. Therefore, a wired or wireless communication may be established between the control unit 123 and the transmission unit 124, and the transmission unit 124 is not limited to a wire transmission unit.

These programs stored in the storage unit 122 include a correction program and/or a calibration coefficient program. The correction program and the calibration coefficient program can help to improve the spectral radiation flux accuracy of the spectrum measurement device 100. The control unit 123 or the external processing device 10 can execute the correction program and the calibration coefficient program, and can also selectively enable or disable at least one of the correction program and the calibration coefficient program. In addition, the correction program and the calibration coefficient program both may be generated by performing the optical calibration method as described in FIG. 2A, and the correction program and/or the calibration coefficient program may be stored in the external processing apparatus 10 (e.g., a desktop computer or a cloud server) or an external storage medium (not shown), such as a disc or a flash drive for example, and is not limited to being stored in the storage unit 122 only.

Figure 2A:
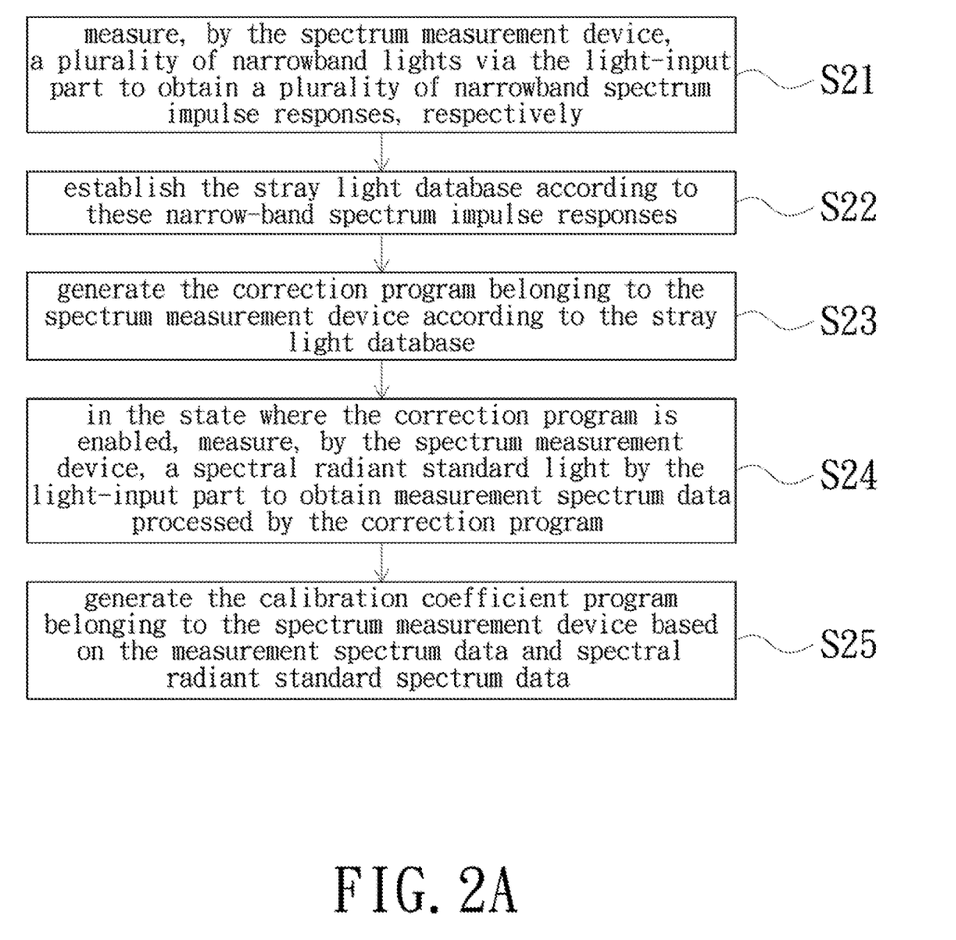
FIG. 2A is a flow chart of an optical calibration method in accordance with an embodiment of the present invention.
Figure 2B:
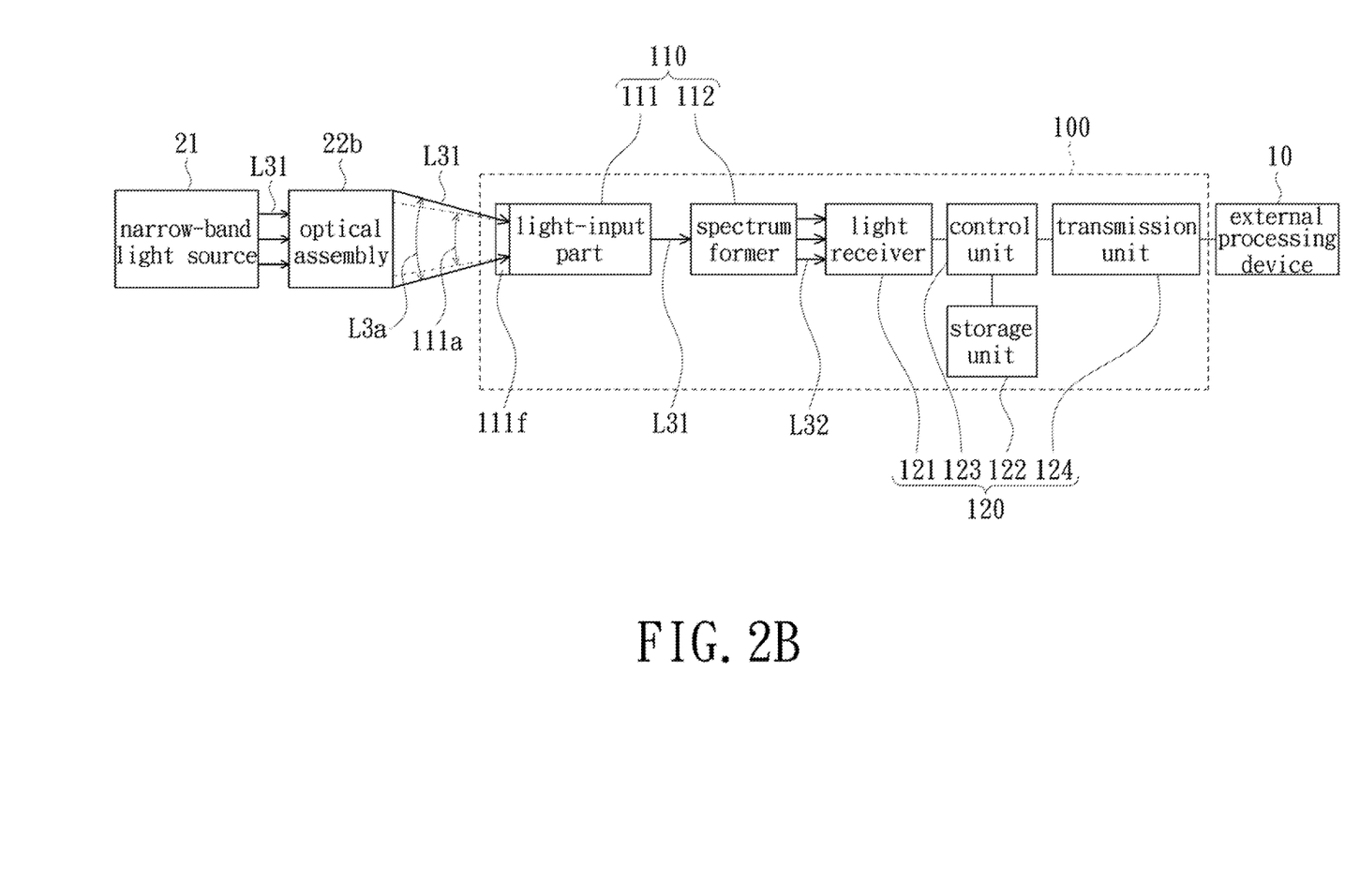
FIG. 2B is a block diagram for illustrating the spectrum measurement device performing step S21 in FIG. 2A.

Please refer to FIGS. 2A and 2B. In the optical calibration method shown in FIG. 2A, first, step S21: measuring, by the spectrum measurement device 100, a plurality of narrow-band rays L31 by the light-input part 111 to obtain a plurality of narrow-band spectrum impulse responses, respectively. These narrow-band rays L31 are, for example, monochromatic rays emitted by the narrow-band ray source 21, such as a monochromator or tunable laser. In addition, the wavelength of each narrow-band ray L31 is different, so that the wavelengths of these narrow-band rays L31 cover a certain range, for example, 300 nanometers (nm) to 800 nm. It is understood that those skilled in the art may decide how many nanometers to emit a narrow-band ray according to the requirements. The smaller the interval, the more accurate the later-resulting stray light database; the larger the interval, the shorter the time spent in step S21.

The narrow-band ray source 21 is configured to output only a narrow-band ray L31 having a specific wavelength at a time, and the light-input part 111 is configured to individually receive these narrow-band rays L31. In other words, these narrow-band rays L31 pass through the light-input part 111 and are emitted into the spectrum former 112 one by one, instead of being emitted into the spectrum former 112 at a time. When these narrow-band rays L31 are individually emitted into the spectrum former 112, the spectrum former 112 can generate a plurality of spectrum beams L32 emitted into the light receiver 121 one by one from these narrow-band rays L31.

The light receiver 121 can individually receive these spectrum beams L32 and convert these spectrum beams L32 into spectrum data in the form of electrical signal, wherein these spectrum data can be referred to as narrow-band spectrum impulse responses. The control unit 123 may be used to process these narrow-band spectrum impulse responses. In other words, each time the light-input part 111 receives a narrow-band ray L31, the control unit 123 receives a corresponding narrow-band spectrum impulse response, which represents the spectrum of one of the narrow-band rays L31. Therefore, the spectrum measurement device 100 is able to obtain these narrow-band spectrum impulse responses.

In the embodiment shown in FIG. 2B, an optical assembly 22b may be disposed between the narrow-band ray source 21 and the light-input part 111, so that these narrow-band rays L31 are emitted into the light-input part 111 after passing through the optical assembly 22b; wherein the optical assembly 22b is optically coupled to the light-input part 111. The optical assembly 22b may be a lens group which may be composed of a plurality of lenses. The optical assembly 22b is configured to focus these narrow-band rays L31 so that each narrow-band ray L31 has a converging angle L3a. The converging angle L3a of each narrow-band ray L31 is greater than or equal to the light-receiving angle 111a; that is, the numerical aperture of each narrow-band ray L31 is greater than or equal to the numerical aperture of the light-input part 111. In addition, the converging angle L3a is determined by the optical assembly 22b, so that the optical assembly 22b can also determine the numerical aperture of each narrow-band ray L31. In the present embodiment, the optical assembly 22b may be used to change the light output mean of the narrow-band ray source 21, thereby simulating the light output mean of a preset light source. In other embodiments, the optical assembly 22b may be omitted.

Referring to FIGS. 2A and 2B. Thereafter, step S22: establishing the stray light database according to these narrow-band spectrum impulse responses. The stray light database has stray light information of the spectrum measurement device and its light-input part. The stray light information includes the stray light generated by these narrow-band rays L31 in the light-input part 111 (including the optical fiber 111f) and the stray light generated by the narrow-band rays L31 received by the optical receiver 121 so far after passing through the light-input part 111. In addition, the wavelengths of these narrow-band rays L31 would cover a certain range (for example, between 300 nm and 800 nm), so that the stray light information apparently includes only stray light having a wavelength within this range and does not include stray light having a wavelength outside the range. In other embodiments, those skilled in the art may adjust the wavelength range covered by the narrow-band ray L31 according to the requirements.

The step S22 may be performed by the spectrum measurement device 100 or the external processing device 10, that is, the stray light database may be established and stored in the spectrum measurement device 100 or the external processing device 10, so that the control unit 123 or the external processing device 10 can establish the stray light database according to these narrow-band spectrum impulse response. The stray light database can be established by using a spectral stray light distribution matrix, and the spectral stray light distribution matrix may be established based on the article "Simple spectral stray light correction method for array spectroradiometers" published in APPLIED OPTICS, Vol. 45, No. 6 on Feb. 20, 2006. Those skilled in the art may use other means to establish the stray light databases according to the requirements.

Figure 2C:
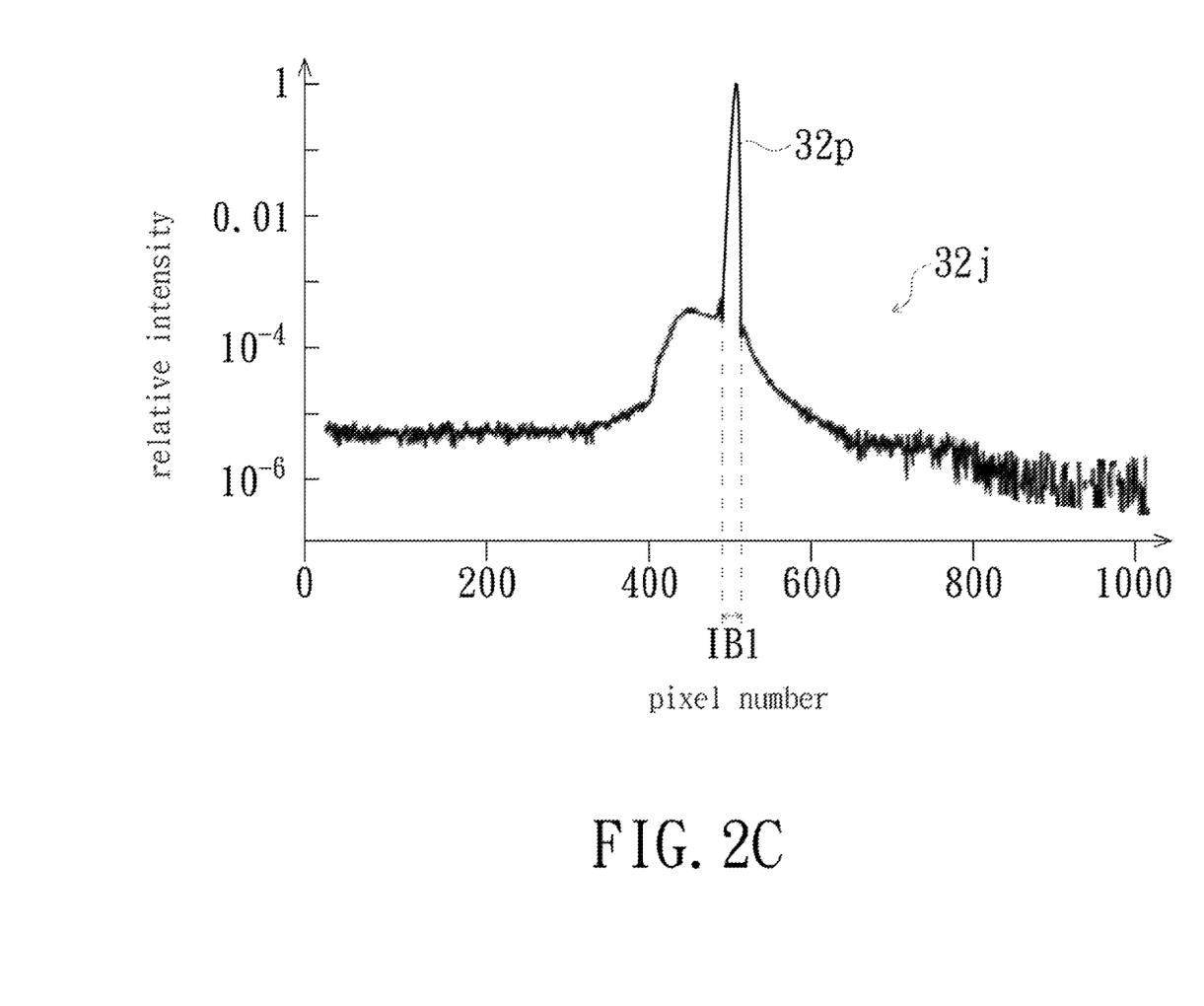
FIG. 2C is a schematic diagram of a narrow-band ray in FIG. 2B.

In detail, referring to FIGS. 2A and 2C. The spectrum 32j shown in FIG. 2C is the spectrum of one of the narrow-band rays L31. In FIG. 2C, the horizontal axis is a pixel number, representing each pixel (not shown) in the light receiver 121. In the embodiment shown in FIG. 2C, the total number of pixels is 1024. The vertical axis is the relative intensity and the maximum value thereof is 1.

In the light receiver 121 of the present embodiment, these 1024 pixels may be arranged as a line or an array. Each pixel substantially receives a spectrum beam having a specific wavelength (e.g., the spectrum beam L32 or the spectrum beam L2), so that the wavelengths of the rays received by these pixels are basically different from each other. Thus, the pixel number in FIG. 2C may represent the wavelength of a spectrum beam. In addition, the spectrum 32j (equivalent to one of the narrow-band spectrum impulse response) shown in FIG. 2C can be described by line-spread function (LSF). Since the spectrum 32j is generated by measuring a specified narrow-band ray L31, a peak 32p representing the narrow-band ray L31 appears in FIG. 2C, wherein the peak 32p is located within the band IB1. The peak 32p within the band IB1 may be regarded as a real signal of the narrow-band ray L31, and the spectrum 32j other than the band IB1 may be regarded as a signal of stray light.

Figure 2D:
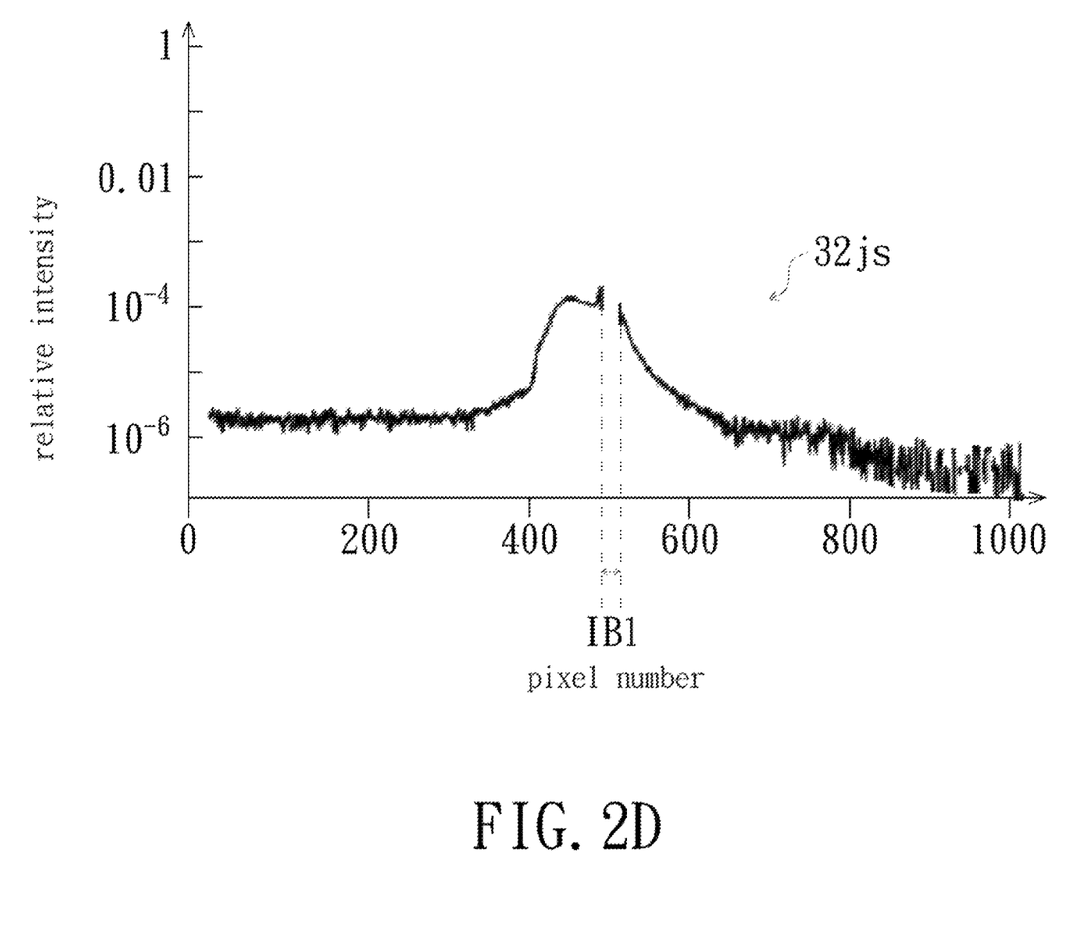
FIG. 2D is a schematic diagram of the stray light spectrum of the narrow-band ray in FIG. 2C.

Referring to FIGS. 2C and 2D. Thereafter, a stray light spectrum 32js is extracted from the spectrum 32j. Since the peak 32p in the band IB1 can be regarded as the real signal of the narrow-band ray L31 and the spectrum 32j other than the band IB1 can be regarded as the signal of the stray light, the relative intensity in the band IB1 is changed to zero by removing the peak 32p in the band IB1, so that the remaining spectrum (shown in FIG. 2D) is theoretically contributed by the stray light. Then, the relative intensity of the spectra 32j other than the band IB1 is divided by the sum of the relative intensities in the band IB1 for normalization, thereby obtaining the stray light spectrum 32js. Then, according to the method disclosed in FIGS. 2C and 2D, a plurality of stray light spectrums are extracted from all of the narrow-band spectrum impulse responses, and a spectral stray light distribution matrix D as shown in FIG. 2E is established based on all of the stray light spectrums (including the stray light spectrum 32js).

Figure 2E:
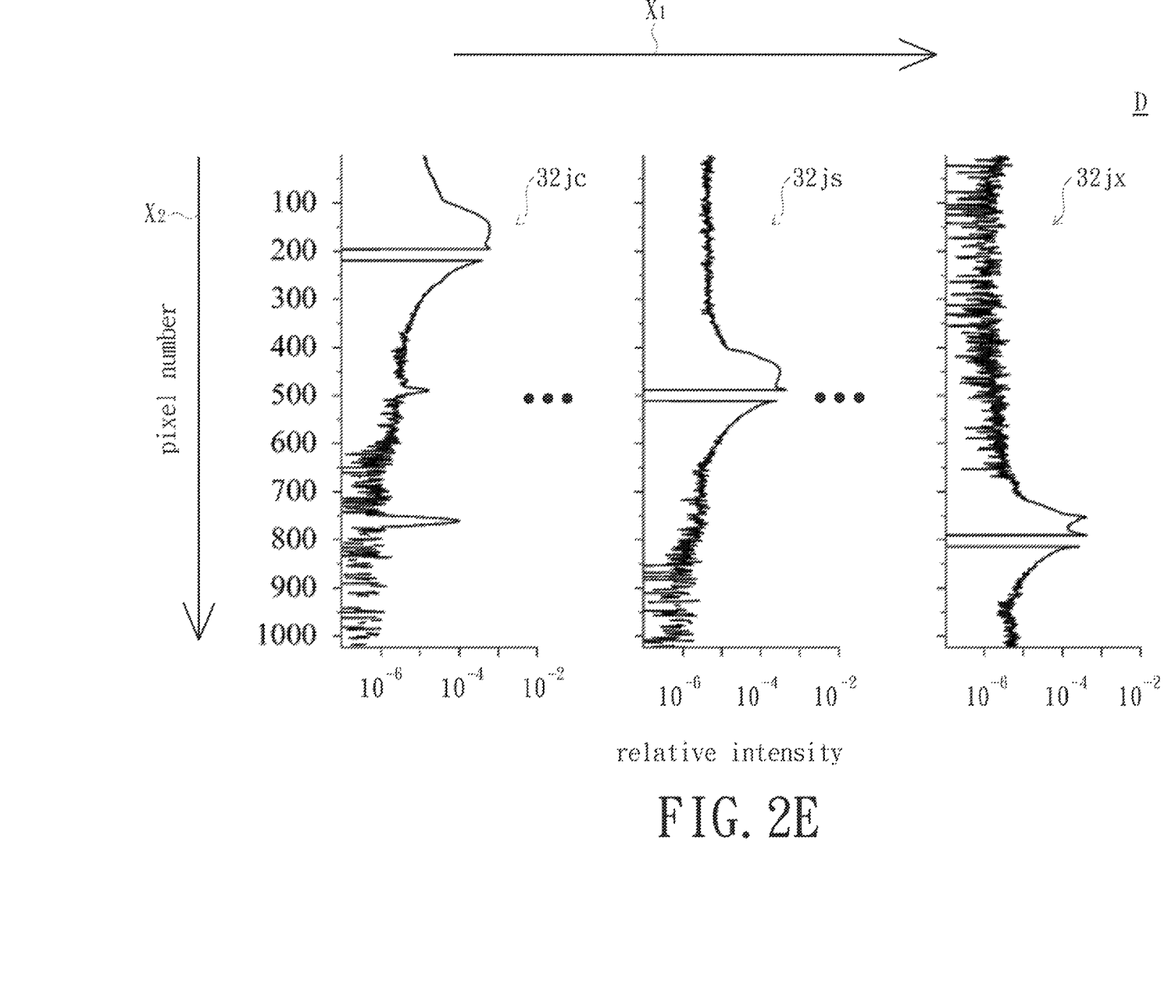
FIG. 2E is a schematic diagram of a spectral stray light distribution matrix established according to a plurality of narrow-band rays in FIG. 2B.

Referring to FIG. 2E. The spectral stray light distribution matrix D substantially includes a plurality of stray light spectrums, and all of these stray light spectrums are derived from different narrow-band rays L31. Taking FIG. 2E as an example, the spectral stray light distribution matrix D includes the stray light spectra 32jc, 32js and 32jx, and these stray light spectrums 32jc, 32js and 32jx are all derived from the narrow-band rays L31 having wavelengths different from each other.

In the spectral stray light distribution matrix D, the relative intensity of each pixel in the same stray light spectrum (e.g., the stray light spectrum 32jc, 32js or 32jx) is sequentially filled in one of the columns of the matrix in a row direction X2, and the relative intensity of the different narrow-band ray L31 received by the same pixel is sequentially filled in one of the rows of the matrix in a column direction X1. Thus, the spectral stray light distribution matrix D shown in FIG. 2E is completed. In addition, since the peak 32p in the band IB1 is removed (see FIG. 2D), the elements on the diagonal line in the spectral stray light distribution matrix D are all zero; for example, the element in the first row and the first column, the element in the second row and the second column, and the element in the third row and the third column are all zero.

The spectral stray light distribution matrix D represents the impact of the stray light on the spectrum measurement device 100, and the spectral stray light distribution matrix D satisfies the following mathematical formula (1).

$$Ym = Yr + DYr \quad (1)$$

In the mathematical formula (1), Ym and Yr both are column matrices. Ym represents the spectrum actually measured by the spectrum measurement device 100, for example, the spectrum obtained by measuring the survey light L1 or the narrow-band ray L31. Yr represents the ideal spectrum after removing or reducing the impact of stray light.

The mathematical formula (1) can be rewritten as the following mathematical formula (2).

$$Ym = (I+D)Yr \quad (2)$$

In the mathematical formula (2), I is an identity matrix. Ym, D and I are known, and Yr is unknown, therefore, the ideal spectrum without or with reduced impact of stray light is obtained by solving the mathematical formula (2) to find the solution of Yr.

According to the linear algebra, there are several means to obtain the solution of the mathematical formula (2). For example, Yr can be obtained by applying the Gaussian elimination algorithm on the mathematical formula (2). Or, Yr can be obtained by the iterative approach which is mentioned on page 1114 of the above-mentioned the article in APPLIED OPTICS. In the present embodiment, Yr is obtained by using an inverse matrix.

In detail, the mathematical formula (2) can be rewritten as the following mathematical formula (3).

$$Ym = (I+D)Yr = AYr \quad (3)$$

In the mathematical formula (3), A is a coefficient matrix and represents a stray light database, wherein the stray light database A satisfies the mathematical formula: A=(I+D). That is, the stray light database A is obtained by adding the spectral stray light distribution matrix D to the identity matrix I, thereby completing step S22. In addition, since the elements on the diagonal line in the spectral stray light distribution matrix D are all zero, the elements on the diagonal line in the stray light database A are all 1.

Thereafter, step S23: generating the correction program belonging to the spectrum measurement device 100 according to the stray light database. The correction program is used to correct the stray light generated by the spectrum measurement device 100 and its light-input part 111, wherein the correction program generated according to the stray light database can be generated by the spectrum measurement device 100 or the external processing device 10. In the present embodiment, the correction program generated by the spectrum measurement device 100 is taken as an example, and the correction program may be stored in the storage unit 122 of the spectrum measurement device 100. However, in other embodiments, the correction program may be generated by the external processing device 10, and the correction program may be stored in an external storage medium, such as a disc, a memory card, a hard disk or a cloud hard disk. The correction program may include a linear algebraic algorithm, such as an inverse matrix. In detail, the mathematical formula (3) can be deduced into the following mathematical formula (4).

$$A^{-1}Ym = A^{-1}AYr = Yr \qquad (4)$$

In the mathematical formula (4), $A^{-1}$ is the inverse matrix of A and is the correction program, so the correction program can be the inverse matrix of the coefficient matrix A (i.e., the stray light database). According to the mathematical formula (4), it is clear that the ideal spectrum Yr can be obtained by multiplying the actually measured spectrum Ym by the inverse matrix $A^{-1}$.

Based on the above description, after measuring these narrow-band rays L31 to obtain these narrow-band spectrum impulse responses (e.g., the spectrum 32$j$ shown in FIG. 2C), the stray light database can be established and the correction program can be generated according to these narrow-band spectrum impulse responses. The correction program can be generated by using linear algebra, such as an inverse matrix. When the control unit 123 enables the correction program, the impact of the stray light can be reduced or eliminated, thereby improving the accuracy of the spectrum measurement device 100.

It is to be noted that the above correction program is established based on the stray light generated by the inherent optical path in the spectrum measurement device 100. The inherent optical path is referred to as the practical path from which the ray is transmitted from the light-input part 111 to the light receiver 121, and the inherent optical path is determined by the practical optical layout constituted by the light-input part 111, the spectrum former 112 and the light receiver 121. If there is a slight variation in the practical optical layout such as moving the spectrum former 112, the inherent optical path would change, so that the stray light generated by the inherent optical path would also change.

In other words, once the spectrum measurement device 100 already has the correction program, if any optical element (e.g., the optical fiber 111$f$) of the optical module 110 or the light receiver 121 is moved, the inherent optical path in the spectrum measurement device 100 would change, causing the original stray light to change, thus the effect of the correction program changes or even the correction program cannot reduce the stray light. In addition, in the actual case, the inherent optical paths of any two spectrum measurement devices 100 are not identical to each other, and therefore, the stray lights of any two spectrum measurement devices 100 are different from each other; thus, each of the spectrum measurement devices 100 has a different correction program.

According to the above description, it is known that the correction program is generated according to a plurality of narrow-band spectrum impulse responses obtained by measuring a plurality of narrow-band rays L31, and the wavelengths of these narrow-band rays L31 cover a certain range (e.g., 300 nm to 800 nm). Thus, the correction program is basically applicable to the survey light L1 in the wavelength range covered by these narrow-band rays L31. The correction program may be difficult to effectively reduce the impact of the stray light for the survey light L1 other than the wavelength range covered by these narrow-band rays L31. In other words, the correction program can only eliminate or reduce the impact of stray light in a particular wavelength range.

Figure 2F:
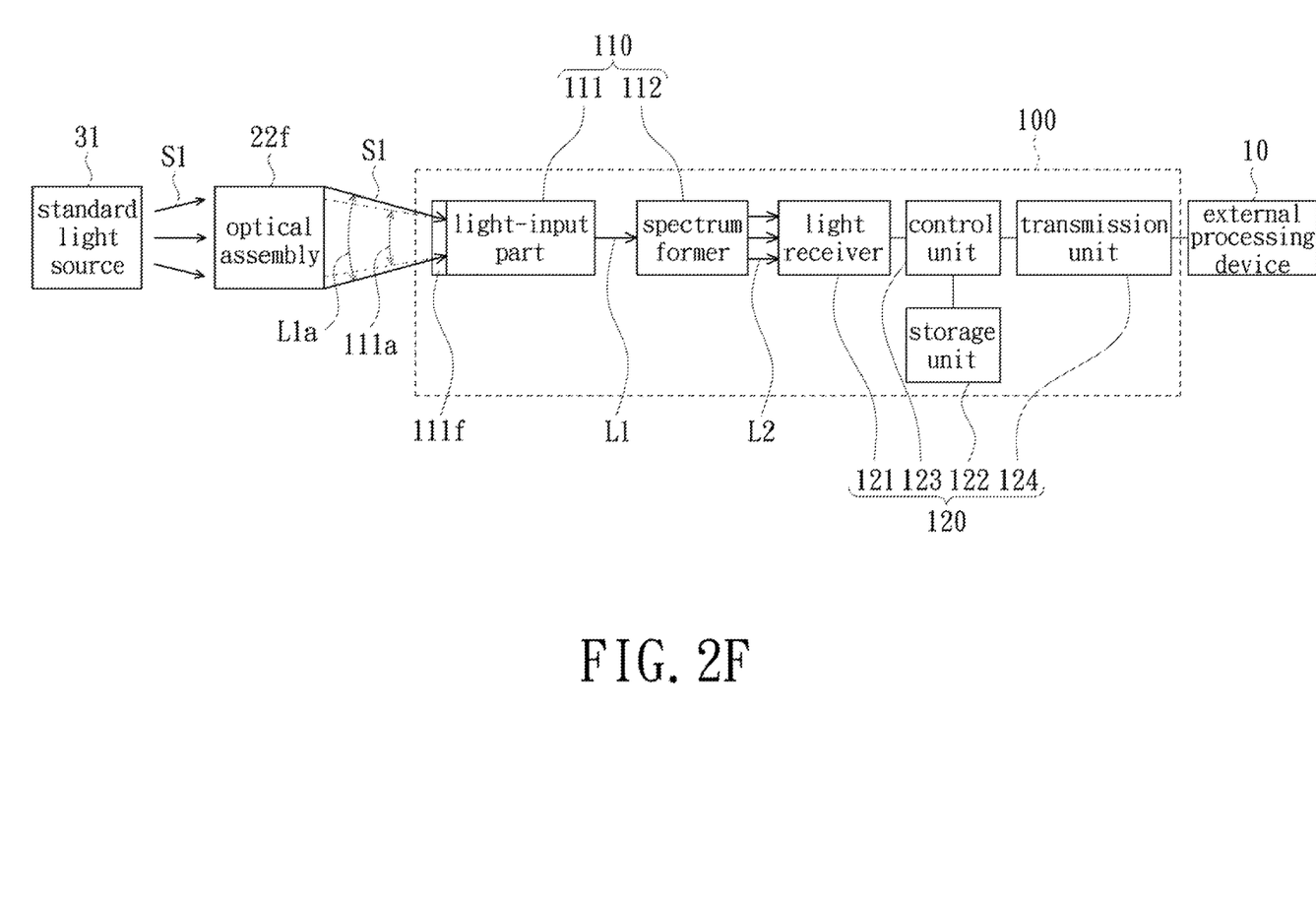
FIG. 2F is a block diagram for illustrating the spectrum measurement device performing step S24 in FIG. 2A.

Referring to FIGS. 2A and 2F. Step S24 and step S25 are sequentially performed to generate and store the calibration coefficient program. Specifically, step S24: in the state in which the correction program is enabled, measuring, by the spectrum measurement device 100, a spectral radiant standard light S1 by the light-input part 111 to obtain measurement spectrum data processed by the correction program. The spectral radiant standard light S1 has a continuous spectrum and can be emitted by a spectral radiant standard light source. The spectral radiant standard light source is a light source with absolute spectral radiation flux information provided by a standard measurement constitute, such as a halogen lamp or an incandescent lamp. Under a condition that the control unit 123 enables the correction program stored in the storage unit 122, the spectrum measurement device 100 corrects the obtained measurement spectrum data according to the correction program after the spectral radiant standard light S1 is measured by the spectrum measurement device 100. Therefore, theoretically the stray light signal caused by the inherent optical path in the spectrum measurement device 100 is very low in the corrected measurement spectrum data, so that the spectrum measurement device 100 can measure the spectrum of the spectral radiant standard light S1 having a low degree of impact from stray light.

In step S21 and step S24, the spectrum measurement device 100 can measure the spectrums of these narrow-band rays L31 and the spectral radiant standard light S1 under the same light input condition. For example, the spectrum measurement device 100 uses the same light-input part 111 to measure the spectrums of these narrow-band rays L31 and the spectral radiant standard light S1. That is, the spectrum of the spectral radiant standard light S1 and all or a portion of the spectrums of these narrow-band rays L31 can be obtained by measuring these narrow-band rays L31 and the spectral radiant standard light S1 passing through the optical fiber 111$f$. Next, for example, the spectrums of the narrow-band rays L31 and the spectral radiant standard light S1 are measured under the same numerical aperture of the light-input part 111, that is, the spectrum measurement of the narrow-band rays L31 and the spectral radiant standard light S1 is performed under the same light-receiving angle 111$a$.

In the embodiment shown in FIG. 2F, an optical assembly 22$f$ may be disposed between the light-input part 111 and a spectral radiant standard light source 31, wherein the optical assembly 22$f$ is optically coupled with the light-input part 111. The spectral radiant standard light S1 is emitted into on the light-input part 111 after passing through the optical assembly 22$f$. The converging angle L1$a$ of the spectral radiant standard light S1 is greater than or equal to the light-receiving angle 111$a$. That is, the numerical aperture of the spectral radiant standard light S1 is greater than or equal to the numerical aperture of the light-input part 111, so that the light-receiving area of the light-input part 111 can be completely irradiated by the spectral radiant standard light S1.

After obtaining the measurement spectrum data, step S25 is performed, in which: generating the calibration coefficient program belonging to the spectrum measurement device 100 based on the measurement spectrum data and spectral radiant standard spectrum data. The calibration coefficient program matches the measurement spectrum data with the spectral radiant standard spectrum data, and the spectral radiant standard spectrum data may be obtained by measuring the spectral radiant standard light S1 by a standard spectrum measurement device. Thereafter, the correction program and/or the calibration coefficient program may be stored in the storage unit 122 of the spectrum measurement device 100 or the external processing device 10. It is to be noted that the operation can be made more real-time by storing the correction program and the calibration coefficient program in the storage unit 122 of the spectrum measurement device 100.

More specifically, the standard spectrum measurement device has a low stray light characteristic and can utilize hardware or software to effectively reduce stray light. In the hardware aspect, for example, the standard spectrum measurement device may use an anti-temperature-drift optical system, an optical element having a low thermal expansion coefficient, an optical element having a high precision and low tolerance, a stray light elimination element and/or a filter to achieve the low stray light characteristic. In the software aspect, for example, the standard spectrum measurement device may be another spectrum measurement device that has been calibrated by the calibration method of the present invention. That is, the standard spectrum measurement device may have been processed by the above steps S21 to S23 and has generated its own correction program, and the spectral radiant standard spectrum data is obtained by measuring the spectrum of the spectral radiant standard light S1 under the condition that the correction program of the standard spectrum measurement device is enabled. Thus, the low stray light characteristic is also achieved.

It should be noted that the measurement spectrum data and spectral radiant standard spectrum data with stray light would seriously affect the effect of the calibration coefficient program generated in step S25. In the present embodiment, the stray light of the measurement spectrum data and spectral radiant standard spectrum data is first reduced by means of the hardware and/or software. Thereafter, step S25: generating, by the external processing device 10, the calibration coefficient program belonging to the spectrum measurement device 100 based on the measurement spectrum data and the spectral radiant standard spectrum data. That is, the calibration coefficient program generated in the condition that the stray light is low can cause the spectrum measurement device 100 and the standard spectrum measurement device to obtain a closer measurement result when measuring the same survey light L1. In other embodiments, the calibration coefficient program may be generated by other electronic devices with computing ability, such as the control unit 123 of the spectrum measurement device 100. Then, the external processing device 10 may store the calibration coefficient program belonging to the spectrum measurement device 100 in its storage unit 122.

Based on the above description, in actual implementation, when the correction program and the calibration coefficient program of the spectrum measurement device 100 are enabled, the spectrum data obtained by the spectrum measurement device 100 measuring the survey light L1 by using the light-input part 111 (including the optical fiber 111f) will be close to the spectrum data obtained by the standard spectrum measurement device measuring the same survey light L1; and the two spectrum data would even be substantially the same. The wavelength of the survey light L1 may overlap with the wavelength range covered by these aforementioned narrow-band rays L31, so that the correction program can effectively reduce the impact of the stray light. As a result, the correction program and the calibration coefficient program can reduce the accuracy difference between the spectrum measurement device 100 and the standard spectrum measurement device and make the measurement results of the two consistent.

In addition, in the optical calibration method described in FIG. 2A, since these narrow-band spectrum impulse responses are obtained by measurement performed by the light-input part 111 that includes the optical fiber 111f, the stray light database would include the stray light signal generated by the optical input unit 111. Therefore, the correction program would automatically eliminate the impact of stray light generated by the light-input part 111 if the correction program generated according to the calibration method of FIG. 2A is enabled. Thus, when the spectrum measurement device 100 measures the survey light L1 while the correction program and the calibration coefficient program both have been enabled, the spectrum measurement device 100 needs to be disposed with the light-input part 111 (including the optical fiber 111f) and measures the survey light L1 by the light-input part 111, so that the correction program can correctly eliminate or reduce the impact of stray light and thereby effectively reduces the difference in the measurement result between the spectrum measurement device 100 and the standard spectrum measurement device.

The calibration coefficient program may be a ratio function, which contains a ratio corresponding to each light wavelength. That is, the value of the ratio function changes with the light wavelength. The method of generating the calibration coefficient program may obtain the ratio function by dividing the spectral radiant standard spectrum data with the measurement spectrum data. When the calibration coefficient program and the correction program both are measured by the enabled spectrum measurement device 100, the control unit 123 (or the external processing device 10) can multiply the obtained spectrum data with the ratio function. For example, if the ratio corresponding to the wavelength of 500 nm is 2, the control unit 123 multiplies the value (e.g., light intensity) of the wavelength of 500 nm in the spectrum data by two.

In addition, the correction program and the calibration coefficient program may also cause the measurement results of at least two spectrum measurement devices 100 to be coincident with that of the standard spectrum measurement device and cause these spectrum measurement devices 100 to have luminous flux accuracy close or identical to that of the standard spectrum measurement device. That is, more than one spectrum measurement devices 100 may independently perform the above optical calibration method to obtain respective correction programs and calibration coefficient programs, so that the measurement results of these spectrum measurement devices 100 can coincide with each other, thereby reducing the machine difference between these spectrum measurement devices 100. In addition, since the stray light of any two spectrum measurement devices 100 is substantially different from each other, the correction program and calibration coefficient program of one spectrum measurement device 100 cannot apply to another one spectrum measurement device 100.

Figure 3:
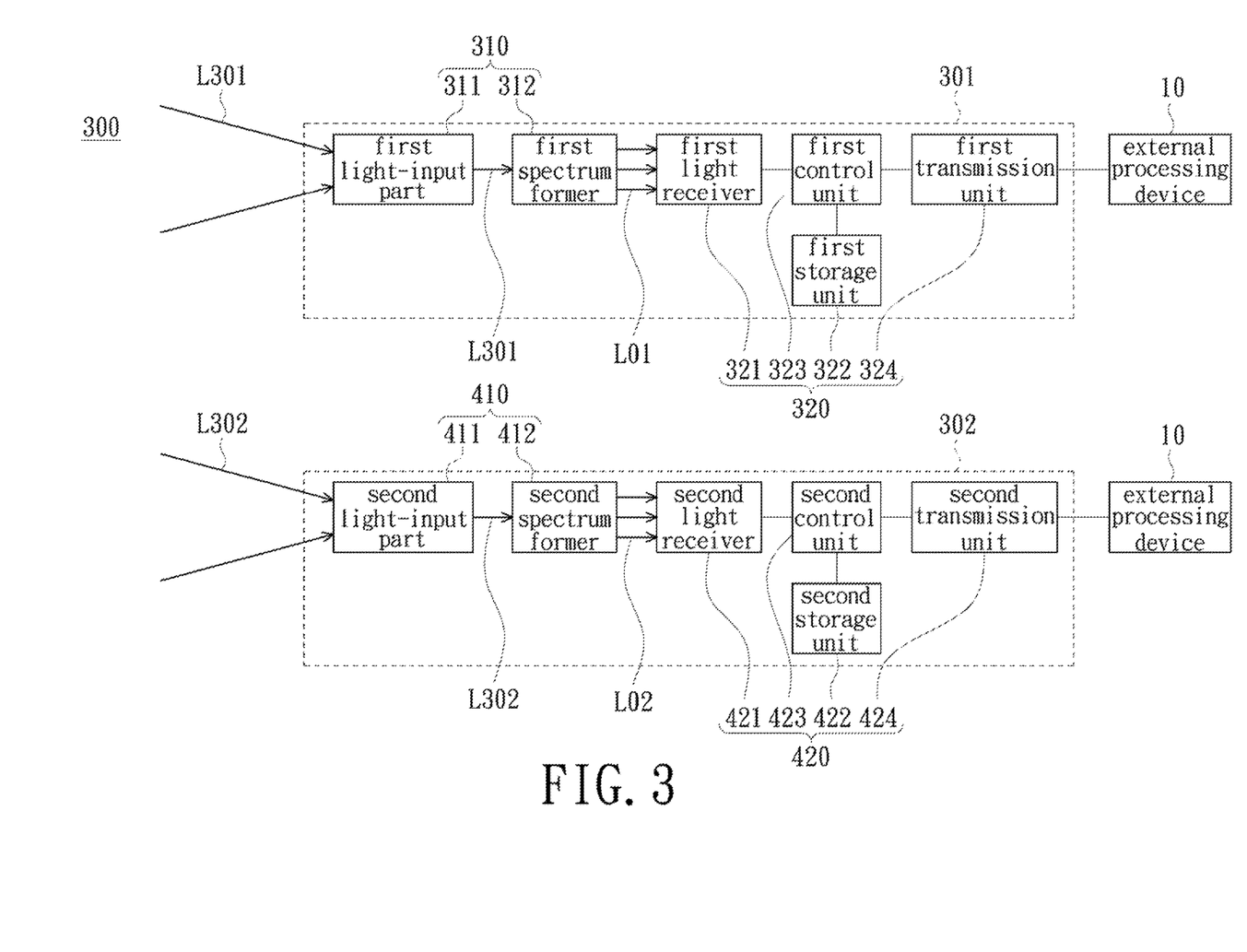
FIG. 3 is a block diagram of a spectrum measurement system in accordance with an embodiment of the present invention.

FIG. 3 is a block diagram of a spectrum measurement system in accordance with an embodiment of the present invention. Referring to FIG. 3, the spectrum measurement system 300 of the present embodiment includes a plurality of (at least two) spectrum measurement devices and at least one external processing device 10. Each spectrum measurement device includes an optical module and a circuit module, wherein the optical modules include a plurality of light-input parts, respectively. In FIG. 3, the spectrum measurement system 300 includes at least two spectrum measurement devices, namely the first spectrum measurement device 301 and the second spectrum measurement device 302, respectively.

The first spectrum measurement device 301 includes a first optical module 310 and a first circuit module 320. The first optical module 310 includes a first light-input part 311 and a first spectrum former 312. The first optical module 320 includes a first light receiver 321, a first storage unit 322, a first control unit 323 and a first transmission unit 324. The second spectrum measurement device 302 includes a second optical module 410 and a second circuit module 420. The second optical module 410 includes a second light-input part 411 and a second spectrum former 412. The second circuit module 420 includes a second light receiver 421, a second storage unit 422, a second control unit 423 and a second transmission unit 424.

The first spectrum measurement device 301 and the second spectrum measurement device 302 can be described with reference to the spectrum measurement device 100 of the above-described embodiment, and no redundant detail is to be given herein. Therefore, the first spectrum measurement device 301 and the second spectrum measurement device 302 may perform the optical calibration method described in FIG. 2A to generate a first correction program and a first calibration coefficient program belonging to the first spectrum measurement device 301 and a second correction program and a second calibration coefficient program belonging to the second spectrum measurement device 302.

An embodiment of the present invention also provides an optical measurement method that applicable to a spectrum measurement system that has been calibrated by the aforementioned optical calibration method described in FIG. 2A, such as the spectrum measurement system 300 of FIG. 3. The correction program (e.g., the first and second correction programs) and/or the calibration coefficient program (e.g., the first and second calibration coefficient programs) may be stored in the first spectrum measurement device 301 and the second spectrum measurement device 302, the external processing device 10 (e.g., cloud server) and/or an external storage medium, wherein the external storage medium is, for example, a disc or a flash drive. The correction program and/or the calibration coefficient program have machine identification information associated with the spectrum measurement device. The machine identification information enables the spectrum measurement device to use its correction program and/or calibration coefficient program and causes the aforementioned correction program and/or calibration coefficient program to be used only to correct the spectrum data generated by the spectrum measurement device.

In the optical measurement method of the present embodiment of FIG. 3, first, the first spectrum measurement device 301 and the second spectrum measurement device 302 establish the spectrum measurement system 300 according to the optical calibration method described in the above embodiments. Thereafter, the first spectrum measurement device 301 measures the first survey light L301 to obtain first spectrum data and the second spectrum measurement device 302 measures the second survey light L302 to obtain second spectrum data. Specifically, The first spectrum measurement device 301 measures the first survey light L301 by the first light-input part 311 and the second spectrum measurement device 302 measures the second survey light L302 by the second light-input part 411.

Thereafter, the first spectrum data is processed according to the first correction program and/or the first calibration coefficient program in a state in which the first correction program and/or the first calibration coefficient program are enabled. The processed first spectrum data is less affected by stray light and can match the data measured by the standard spectrum measurement device. On the other hand, the second spectrum data is processed according to the second correction program and/or the second calibration coefficient program in a state in which the second correction program and/or the second calibration coefficient program are enabled. The processed second spectrum data is less affected by stray light and can match the data measured by the standard spectrum measurement device. That is, the corrected first spectrum data and the corrected second spectrum data would also be matched to each other indirectly. However, in other embodiments, the first correction program and/or the first calibration coefficient program, as well as the second correction program and/or the second calibration coefficient program, may be disabled depending on specific situation, and the first and second spectrum data are processed under this specific situation. Therefore, the first and second correction programs and the first and second calibration coefficient programs can be enabled or disabled according to user's requirement.

Based on the above description, both of the first spectrum data and the second spectrum measurement device 302 have an accuracy that is close or equal to that of the standard spectrum measurement device under the condition that the first correction program, the second correction program, the first calibration coefficient program and the second calibration coefficient program are enabled. As a result, both of the first spectrum measurement device 301 and the second spectrum measurement device 302 can accurately measure the first survey light L301 and the second survey light L302, respectively, when the impact of stray light is eliminated or reduced. And the measuring effect of the first spectrum measurement device 301 and the second spectrum measurement device 302 is similar to the standard spectrum measurement device measuring the first survey light L301 and the second survey light L302, respectively. Those skilled in the art may also establish a spectrum measurement system with more spectrum measurement devices according to the requirement.

In summary, with the above correction program, the impact of the stray light on the measurement result can be reduced so as to cause the spectrum measurement device (e.g., the first spectrum measurement device 301 or the second spectrum measurement device 302) to generate the calibration coefficient program with a low degree of impact of stray light. Thus, the difference in measurement results between the plurality of spectrum measurement devices is reduced and the measurement results of these spectrum measurement devices are consistent. In addition, the above-described optical calibration method allows the plurality of spectrum measurement devices to have accuracy close or equal to that of the standard spectrum measurement device, thereby establishing a spectrum measurement system that includes a plurality of high-accuracy spectrum measurement devices. Therefore, with this spectrum measurement system, accurate spectrum measurement of a large number of products or samples can be performed at one time, thereby increasing the throughput on the spectrum measurement.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical calibration method for a spectrum measurement device, the spectrum measurement device comprising a light-input part, and the optical calibration method comprising steps of:
measuring, by the spectrum measurement device, a plurality of narrow-band rays by the light-input part to obtain a plurality of narrow-band spectrum impulse responses, respectively;
establishing a stray light database according to the narrow-band spectrum impulse responses, wherein the stray light database has stray light information of the spectrum measurement device and the light-input part of the spectrum measurement device;
generating a correction program belonging to the spectrum measurement device according to the stray light database, wherein the correction program is used to correct stray light generated by the spectrum measurement device and the light-input part of the spectrum measurement device;
in a state in which the correction program is enabled, measuring, by the spectrum measurement device, a spectral radiant standard light by the light-input part to obtain measurement spectrum data processed by the correction program; and
generating a calibration coefficient program belonging to the spectrum measurement device based on the measurement spectrum data and spectral radiant standard spectrum data, wherein the calibration coefficient program matches the measurement spectrum data with the spectral radiant standard spectrum data, and the spectral radiant standard spectrum data is obtained by measuring, by a standard spectrum measurement device, the spectral radiant standard light.

2. The optical calibration method according to claim 1, wherein the step of establishing the stray light database according to the narrow-band spectrum impulse responses is generated by the spectrum measurement device or an external processing device.

3. The optical calibration method according to claim 1, wherein the correction program generated based on the stray light database is generated by the spectrum measurement device or an external processing device.

4. The optical calibration method according to claim 1, wherein the step of in the state in which the correction program is enabled, measuring, by the spectrum measurement device, the spectral radiant standard light by the light-input part to obtain the measurement spectrum data processed by the correction program is realized by executing the correction program by the spectrum measurement device or an external processing device.

5. The optical calibration method according to claim 1, wherein the step of measuring, by the standard spectrum measurement device, the spectral radiant standard light to obtain the measurement spectrum data comprises steps of:
measuring, by the standard spectrum measurement device, a plurality of first narrow-band rays by the light-input part to obtain a plurality of first narrow-band spectrum impulse responses, respectively;
establishing a first stray light database according to the first narrow-band spectrum impulse responses, wherein the first stray light database has stray light information of the standard spectrum measurement device and the light-input part of standard spectrum measurement device;
generating a first correction program according to the first stray light database, wherein the first correction program is used to correct stray light generated by the standard spectrum measurement device and the light-input part of the standard spectrum measurement device; and
in a state in which the first correction program is enabled, measuring, by the standard spectrum measurement device, a spectrum of the spectral radiant standard light by the light-input part to obtain the spectral radiant standard spectrum data processed by the first correction program.

6. The optical calibration method according to claim 1, further comprising steps of:
measuring, by a second spectrum measurement device, a plurality of second narrow-band rays by a light-input part of the second spectrum measurement device to obtain a plurality of second narrow-band spectrum impulse responses, respectively;
establishing a second stray light database according to the second narrow-band spectrum impulse responses, wherein the second stray light database has stray light information of the second spectrum measurement device and the light-input part of the second spectrum measurement device;
generating a second correction program according to the second stray light database, wherein the second correction program is used to correct a stray light generated by the second spectrum measurement device and the light-input part of the second spectrum measurement device;
in a state in which the second correction program is enabled, measuring, by the second spectrum measurement device, a spectrum of the spectral radiant standard light by the light-input part of the second spectrum measurement device to obtain second measurement spectrum data processed by the second correction program; and
generating a second calibration coefficient program based on the second measurement spectrum data and the spectral radiant standard spectrum data, wherein the second calibration coefficient program matches the second measurement spectrum data with the spectral radiant standard spectrum data, and the spectral radiant standard spectrum data is obtained by measuring the spectral radiant standard light by the standard spectrum measurement device.

7. The optical calibration method according to claim 1, wherein a numerical aperture of each of the narrow-band rays is greater than or equal to a numerical aperture of the light-input part, and a numerical aperture of the spectral radiant standard light is greater than or equal to the numerical aperture of the light-input part.

8. The optical calibration method according to claim 1, wherein the narrow-band rays are emitted by a narrow-band ray source, an optical assembly is disposed between the narrow-band ray source and the light-input part, the narrow-band rays are emitted into the light-input part after passing through the optical assembly, and the optical assembly is used to determine a numerical aperture of each of the narrow-band rays.

9. The optical calibration method according to claim 1, further comprising a step of:
storing the correction program and/or the calibration coefficient program in a non-volatile memory in the spectrum measurement device.

10. The optical calibration method according to claim 1, further comprising a step of:

storing the correction program and/or the calibration coefficient program in an external storage medium, wherein the correction program and/or the calibration coefficient program has machine identification information associated with the spectrum measurement device, and the machine identification information allows the correction program and/or the calibration coefficient program to be used only to correct the spectrum data generated by the spectrum measurement device.

11. A spectrum measurement system, comprising:
a first spectrum measurement device, configured to generate a first correction program and a first calibration coefficient program belonging to the first spectrum measurement device by using the optical calibration method as claimed in claim 1, and the first spectrum measurement device comprising:
  a first optical module, comprising a first light-input part and a first spectrum former, wherein the first light-input part is configured to receive a first survey light, and the first spectrum former is configured to generate a plurality first spectrum beams from the first survey light; and
  a first circuit module, comprising:
    a first light receiver, configured to generate first spectrum data according to the first spectrum beams; and
    a first control unit, electrically connected to the first light receiver; and
an external processing device, coupled to the first control unit, wherein the first control unit or the external processing device processes the first spectrum data according to the first correction program and/or the first calibration coefficient program.

12. The spectrum measurement system according to claim 11, further comprising:
a second spectrum measurement device, configured to generate a second correction program and a second calibration coefficient program belonging to the second spectrum measurement device by using the optical calibration method as claimed in claim 1, and the second spectrum measurement device comprising:
  a second optical module, comprising a second light-input part and a second spectrum former, wherein the second light-input part is configured to receive a second survey light, and the second spectrum former is configured to generate a plurality second spectrum beams from the second survey light; and
  a second circuit module, comprising:
    a second light receiver, configured to generate second spectrum data according to the second spectrum beams; and
    a second control unit, electrically connected to the second light receiver and coupled to the external processing device, wherein the second control unit or the external processing device processes the second spectrum data according to the second correction program and/or the second calibration coefficient program.

13. The spectrum measurement system according to claim 11, wherein the first circuit module further comprises:
a storage unit, electrically connected to the control unit and storing the first correction program and/or the first calibration coefficient program.

14. The spectrum measurement system according to claim 11, wherein the storage unit further stores information of whether the first correction program and/or the first calibration coefficient program is enabled or not.

15. A spectrum measurement device for generating a correction program and a calibration coefficient program belonging to the spectrum measurement device by using the optical calibration method as claimed in claim 1, the spectrum measurement device comprising:
an optical module, configured to receive a survey light and generate a plurality of spectrum beams from the survey light; and
a circuit module, comprising:
  a light receiver, configured to receive the spectrum beams to generate spectrum data; and
  a control unit, electrically connected to the light receiver, wherein the control unit or an external processing device processes the spectrum data according to the correction program and/or the calibration coefficient program.

16. The spectrum measurement device according to claim 15, wherein the circuit module further comprises:
a storage unit, electrically connected to the control unit, configured to store the correction program and/or the calibration coefficient program.

17. An optical measurement method applicable to a spectrum measurement device processed by the optical calibration method as claimed in claim 1, the optical measurement method comprising steps of:
establishing a spectrum measurement system, wherein the spectrum measurement system comprises a first spectrum measurement device configured to generate a first correction program and a first calibration coefficient program belonging to the first spectrum measurement device by using the optical calibration method as claimed in claim 1;
measuring, by the first spectrum measurement device, a first survey light to obtain first spectrum data; and
in a state in which the first correction program and/or the first calibration coefficient program is enabled, processing the first spectrum data according to the first correction program and/or the first calibration coefficient program.

18. The optical measurement method according to claim 17, further comprising a step of:
disabling or enabling the first correction program and/or the first calibration coefficient program.

19. The optical measurement method according to claim 17, wherein in the step of establishing the spectrum measurement system, the spectrum measurement system further comprises a second spectrum measurement device configured to generate a second correction program and a second calibration coefficient program belonging to the second spectrum measurement device by using the optical calibration method as claimed in claim 1, and the optical measurement method further comprises steps of:
measuring, by the second spectrum measurement device, a second survey light to obtain second spectrum data; and
in a state in which the second correction program and/or the second calibration coefficient program is enabled, processing the second spectrum data according to the second correction program and/or the second calibration coefficient program.

20. The optical measurement method according to claim 17, wherein in the step of establishing the spectrum measurement system, the first correction program and the first calibration coefficient program are generated in a state in which the first spectrum measurement device has a first light-input part, and in the step of measuring, by the first spectrum measurement device, the first survey light, the first spectrum measurement device measures the first survey light by the first light-input part.

* * * * *